United States Patent
Weisenstein et al.

(10) Patent No.: US 11,978,878 B1
(45) Date of Patent: May 7, 2024

(54) BI-POLAR LITHIUM-ZINC-ION BATTERIES

(71) Applicant: AEsir Technologies, Inc., Bozeman, MT (US)

(72) Inventors: Adam Weisenstein, Bozeman, MT (US); Melissa D. McIntyre, Butte, MT (US); Randy Moore, Joplin, MO (US); Allen Charkey, Winter Haven, FL (US); Viet H. Vu, Cedar Park, TX (US)

(73) Assignee: AEsir Technologies, Inc., Bozeman, MT (US)

( * ) Notice: Subject to any disclaimer, the term of this patent is extended or adjusted under 35 U.S.C. 154(b) by 0 days.

(21) Appl. No.: 18/193,118

(22) Filed: Mar. 30, 2023

(51) Int. Cl.
| | |
|---|---|
| *H01M 4/02* | (2006.01) |
| *H01M 4/24* | (2006.01) |
| *H01M 4/38* | (2006.01) |
| *H01M 4/42* | (2006.01) |
| *H01M 4/66* | (2006.01) |
| *H01M 10/36* | (2010.01) |
| *H01M 4/505* | (2010.01) |
| *H01M 4/525* | (2010.01) |
| *H01M 4/58* | (2010.01) |

(52) U.S. Cl.
CPC ............ *H01M 4/02* (2013.01); *H01M 4/244* (2013.01); *H01M 4/38* (2013.01); *H01M 4/42* (2013.01); *H01M 4/661* (2013.01); *H01M 4/663* (2013.01); *H01M 10/36* (2013.01); *H01M 4/505* (2013.01); *H01M 4/525* (2013.01); *H01M 4/5825* (2013.01); *H01M 2300/0057* (2013.01); *H01M 2300/0062* (2013.01)

(58) Field of Classification Search
None
See application file for complete search history.

(56) References Cited

U.S. PATENT DOCUMENTS

| | | |
|---|---|---|
| 8,357,469 B2 | 1/2013 | Shaffer, II et al. |
| 9,553,329 B2 | 1/2017 | Shaffer, II et al. |
| 10,347,947 B2 | 7/2019 | Bakenov |
| 2019/0379036 A1 | 12/2019 | Cadena |
| 2020/0091521 A1 | 3/2020 | Shaffer, II et al. |
| 2021/0143514 A1 | 5/2021 | Shaffer, II et al. |
| 2022/0013760 A1 | 1/2022 | Shaffer, II et al. |

FOREIGN PATENT DOCUMENTS

| | | | |
|---|---|---|---|
| CN | 105489949 A | | 4/2016 |
| CN | 108346795 A | | 7/2018 |
| EP | 3977550 A1 | | 3/2020 |
| WO | WO 2017/136545 | * | 8/2017 |
| WO | WO 2020/076985 | * | 4/2020 |
| WO | 2021127330 A1 | | 6/2021 |
| WO | 2021188583 A1 | | 9/2021 |

* cited by examiner

*Primary Examiner* — Laura Weiner
(74) *Attorney, Agent, or Firm* — Brooks Kushman P.C.

(57) ABSTRACT

A lithium and zinc ion bi-polar battery includes, in one example, a plurality of carbon or titanium bi-polar current collectors arranged with cells to form a stack of bi-polar configuration such that each of the bi-polar current collectors is between and in direct contact with a zinc electrode and lithium-ion intercalation electrode of an adjacent pair of the cells.

1 Claim, 3 Drawing Sheets

BI-POLAR LITHIUM-ZINC-ION BATTERIES

STATEMENT REGARDING FEDERALLY SPONSORED RESEARCH OR DEVELOPMENT

The invention was made with Government support under Award No. 2051693 from the National Science Foundation. The Government has certain rights to the invention.

TECHNICAL FIELD

This disclosure relates to bi-polar batteries with a lithium-ion and zinc-ion chemistry.

BACKGROUND

A secondary cell may include an electrolyte, separator, anode, and cathode. A bi-polar battery may include anodes and cathodes stacked in series.

Chemical reactions of a secondary cell are reversible. When the cell is being charged for example, the anode may become positive, and the cathode may become negative. When the cell is being discharged, it behaves like a primary cell.

SUMMARY

A bi-polar lithium and zinc ion battery is contemplated. In one example, a zinc anode and a lithium intercalation cathode share a common current collector. The current collector can be a chemically inert and conductive substrate or metallic zinc as part of the anode. This design may reduce the number of current collectors needed in the electrode stack or eliminate them completely, and reduce the number of electrode tabs. This design may also reduce cost, increase energy density, and increase power.

DETAILED DESCRIPTION

Figure 1:
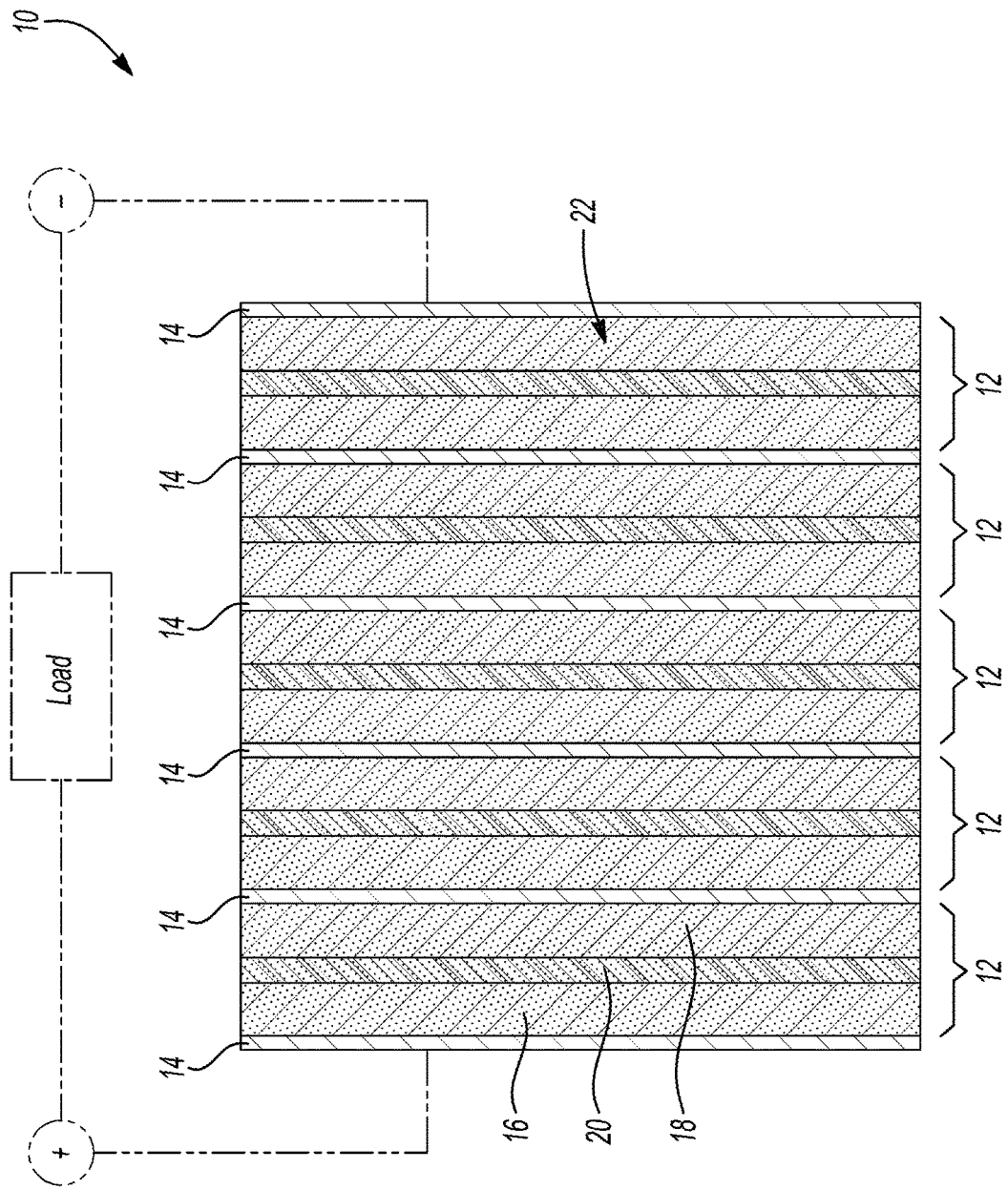
FIG. 1 is a side view, in cross-section, of a bi-polar lithium-zinc-ion battery having shared current collectors.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A challenge of lithium-zinc-ion acidic battery systems is the limited options and cost of the chemically compatible current collectors, along with the volume and weight added by these current collectors. Two of these current collector materials are titanium and carbon. While titanium provides a mechanically robust and chemically resistant current collector, the amount required in a mono-polar design can significantly add cost, weight, and volume to the battery. The cost of carbon current collectors is much lower and is chemically compatible with the acidic electrolyte. The carbon, however, is not as mechanically robust and tabbing from the electrodes is an issue. The inventors have discovered that overall cell resistance can be reduced with a bi-polar design, as opposed to the mono-polar design due to the elimination of tab welds or connections.

A lithium-zinc-ion bi-polar design will thus mitigate the current collector issues mentioned above or eliminate the need for a current collector all together. By the anode and cathode utilizing a common current collector material, such as titanium, the cost, weight, and volume of the battery will be reduced over the traditional mono-polar design.

Zinc foil anodes may also be used in the lithium-zinc-ion chemistry, which would allow for the anode to act as both the active material and current collector. Dense zinc foil is conductive and would be chemically resistant, as the plating and dissolution of the zinc ions in the electrolyte would occur at the outer surface of the foil and not the internal area used as the current collector. This design can also help to reduce resistance by limiting interfacial resistance to the cathode side. This particular design may require a hermetic and conductive coating disposed in contact with the zinc electrode and the lithium-ion intercalation electrode.

The current collector itself can also act a as a substrate for plating and de-plating zinc ions from the electrolyte depending on whether the cell is charged or discharged, respectively. This design would eliminate the need for manufacturing the cell with a zinc electrode.

Referring to FIG. 1, a bi-polar lithium-zinc-ion battery 10 includes a plurality of cells 12 and a plurality of current collectors 14 (e.g., carbon or titanium current collectors) stacked together such that each of the current collectors 14 (not adjacent to an outside surface of the battery 10) is disposed directly between and in contact with an adjacent pair of the cells 12. Each of the cells 12 includes a lithium-ion intercalation electrode 16 (e.g., lithium iron phosphate (LFP), lithium manganese oxide (LMO), lithium cobalt oxide (LCO), lithium nickel manganese cobalt oxide (NMC), lithium nickel cobalt aluminum (NCA), lithium nickel manganese oxide (LNMO), vanadium oxides, and Prussian blue/white), a zinc electrode 18 (e.g., metallic zinc foil, expanded zinc metal sheet, slurry coated metallic zinc particles, and plated/deposited metallic zinc), a separator 20 (e.g., a micro porous, tortuous, electrolyte retaining, ionically conductive, and electronically insulating separator) disposed directly between and in contact with the lithium-ion intercalation electrode 16 and zinc electrode 18, and an acidic (e.g., chloride-based, nitrate-based, triflate-based) electrolyte 22, containing zinc ions and lithium ions, distributed among the lithium-ion intercalation electrode 16, zinc electrode 18, and separator 20. The zinc ions and lithium ions thus facilitate ionic communication between the lithium-ion intercalation electrode 16 and zinc electrode 18.

So arranged, the lithium-ion intercalation electrode 16 of one of the cells 12 and the zinc electrode 18 of another of the cells 12 are on opposite sides of and in direct contact with one of the current collectors 14 (provided the cells 12 are adjacent to each other and the lithium-ion intercalation electrode 16 or zinc electrode 18 is not adjacent to an outside surface of the battery 10). That is, adjacent pairs of the cells 12 each share one of the current collectors 14.

Figure 2:
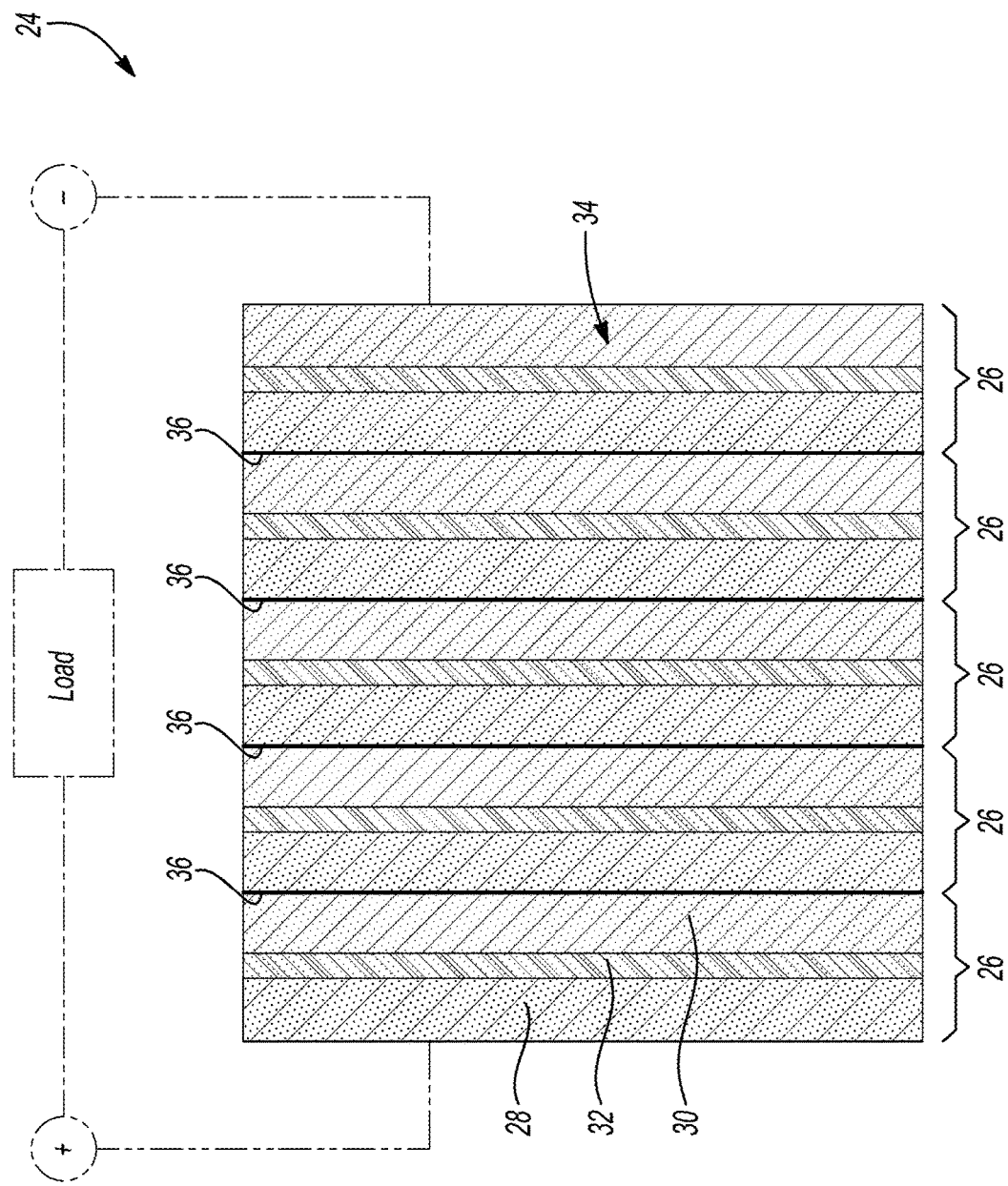
FIG. 2 is a side view, in cross section, of a bi-polar lithium-zinc-ion battery having zinc electrodes as current collectors, lithium-ion intercalation electrodes, and hermetic and conductive coatings disposed in contact with the zinc electrodes and lithium-ion intercalation electrodes.

Referring to FIG. 2, a bi-polar lithium-zinc-ion battery 24 includes a plurality of cells 26 stacked together. Each of the cells 26 includes a lithium-ion intercalation electrode 28, a zinc (foil) electrode 30, a separator 32 disposed directly between and in contact with the lithium-ion intercalation electrode 28 and zinc electrode 30, and an acidic (e.g., chloride-based, nitrate-based, triflate-based) electrolyte 34, containing zinc ions and lithium ions, distributed among the lithium-ion intercalation electrode 28, zinc electrode 30, and separator 32. Each of the cells 26 also includes a hermetic and conductive coating 36 (e.g., carbon-based, conductive polymer, etc.) on an exterior surface of each of the lithium-ion intercalation electrode 28 and zinc electrode 30. The zinc ions and lithium ions thus facilitate ionic communication between the lithium-ion intercalation electrode 28 and zinc electrode 30.

So arranged, the hermetic and conductive coating 36 on the lithium-ion intercalation electrode 28 of one of the cells 26 and the hermetic and conductive coating 36 on the zinc electrode 30 of another of the cells 26 are in direct contact with each other (provided the cells 26 are adjacent to each and the lithium-ion intercalation electrode 28 or zinc electrode 30 is not at an end of the battery 24).

Figure 3:
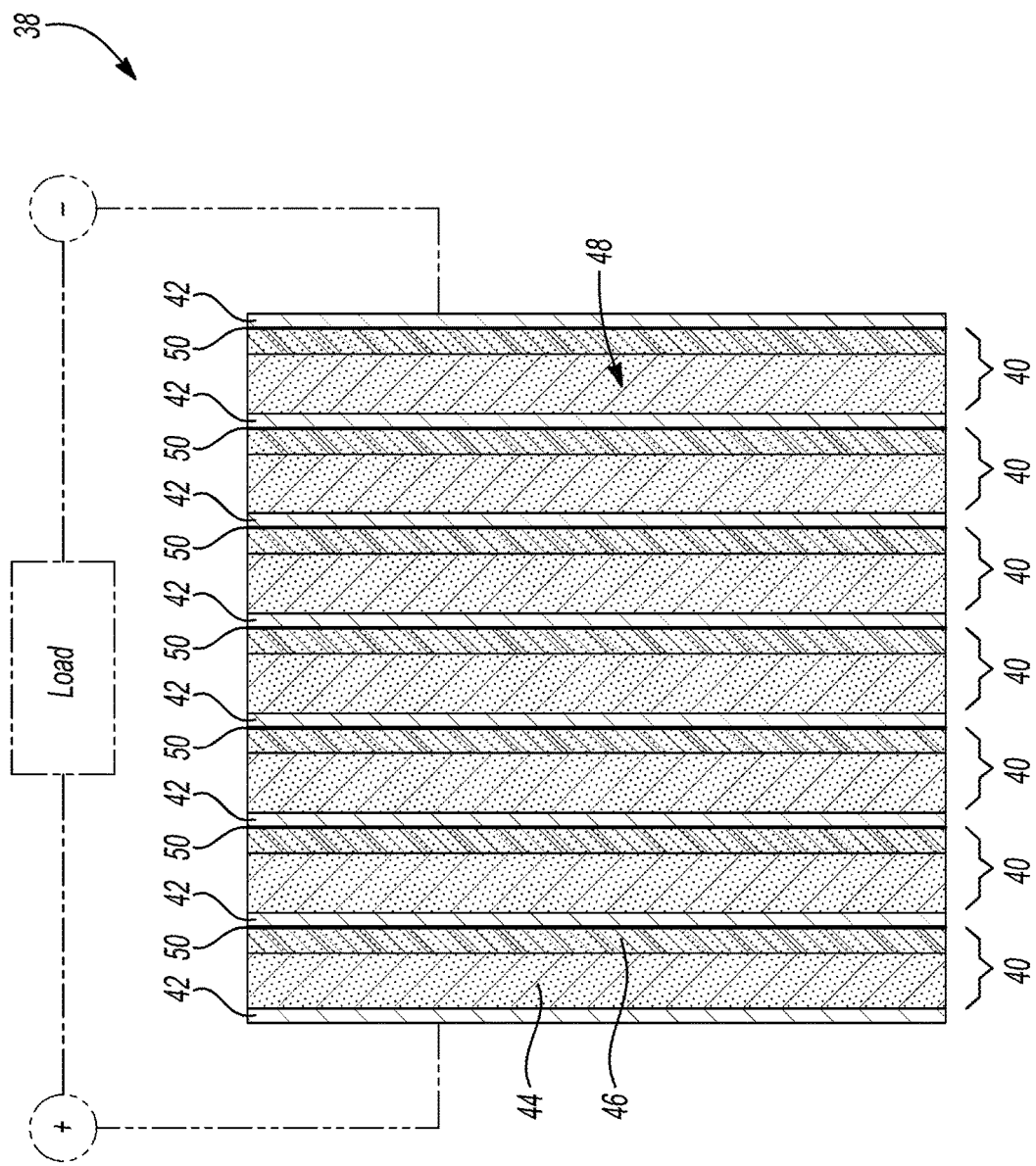
FIG. 3 is a side view, in cross section, of a bi-polar lithium-zinc-ion battery having shared current collectors that facilitate plating and de-plating of zinc ions on one side thereof.

Referring to FIG. 3, a bi-polar lithium-zinc-ion battery 38 includes a plurality of cells 40 and a plurality of current collectors 42 (e.g., carbon or titanium current collectors) stacked together such that each of the current collectors 42 is disposed directly between and in contact with an adjacent pair of the cells 40 (provided that the current collector 42 is not at an end of the battery 38). Each of the cells 40 includes a lithium-ion intercalation electrode 44, a separator 46, and an acidic (e.g., chloride-based, nitrate-based, triflate-based) electrolyte 48, containing zinc ions and lithium ions, distributed among the lithium-ion intercalation electrode 44 and separator 46. During charge, zinc ions plate the current collectors 42 to form deposits 50 thereon.

So arranged, the lithium-ion intercalation electrode 44 of one of the cells 40 and the separator 46 of another of the cells 40 are on opposite sides of and in direct contact with one of the current collectors 42 (provided the cells 40 are adjacent to each other and the lithium-ion intercalation electrode 40 or separator 42 is not adjacent to an end of the battery 34). That is, adjacent pairs of the cells 36 each share one of the current collectors 38.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A lithium and zinc ion bi-polar battery comprising:
 a plurality of cells each including a zinc electrode, a lithium-ion intercalation electrode, a separator between the zinc and lithium-ion intercalation electrodes, and a chloride-based, nitrate-based, or triflate-based acidic electrolyte containing zinc and lithium ions facilitating ionic communication between the zinc and lithium-ion intercalation electrodes; and
 a plurality of carbon bi-polar current collectors or titanium bi-polar current collectors, but not both, arranged with the cells to form a stack of bi-polar configuration such that each of the bi-polar current collectors is between and in direct contact with the zinc electrode and lithium-ion intercalation electrode of an adjacent pair of the cells.

* * * * *